(12) United States Patent
Chertok et al.

(10) Patent No.: US 8,666,145 B2
(45) Date of Patent: Mar. 4, 2014

(54) SYSTEM AND METHOD FOR IDENTIFYING A REGION OF INTEREST IN A DIGITAL IMAGE

(75) Inventors: Michael Chertok, Petah Tikva (IL); Adi Pinhas, Hod Hasharon (ID)

(73) Assignee: Superfish Ltd., Petah Tikva, IL (US)

( * ) Notice: Subject to any disclaimer, the term of this patent is extended or adjusted under 35 U.S.C. 154(b) by 142 days.

(21) Appl. No.: 13/227,208

(22) Filed: Sep. 7, 2011

(65) Prior Publication Data
US 2013/0058537 A1    Mar. 7, 2013

(51) Int. Cl.
*G06K 9/00* (2006.01)
*G06K 9/34* (2006.01)

(52) U.S. Cl.
USPC ............................. 382/154; 382/173; 382/106

(58) Field of Classification Search
CPC .......... G06T 2207/20144; G06T 2207/10012; G06K 9/00664; G06K 9/22
USPC .......................... 382/154, 173, 106
See application file for complete search history.

(56) References Cited

U.S. PATENT DOCUMENTS

| | | | |
|---|---|---|---|
| 6,668,082 B1 * | 12/2003 | Davison et al. ............... | 382/190 |
| 6,980,690 B1 * | 12/2005 | Taylor et al. ................. | 382/154 |
| 7,508,977 B2 * | 3/2009 | Lyons et al. .................. | 382/154 |
| 7,583,275 B2 * | 9/2009 | Neumann et al. ............. | 345/633 |
| 8,045,046 B1 * | 10/2011 | Li et al. ......................... | 348/349 |
| 8,077,965 B2 * | 12/2011 | Kakinami et al. ............. | 382/154 |
| 2001/0010546 A1 * | 8/2001 | Chen ............................. | 348/218 |
| 2002/0001398 A1 * | 1/2002 | Shimano et al. .............. | 382/104 |
| 2008/0129825 A1 * | 6/2008 | DeAngelis et al. ........... | 348/169 |
| 2008/0137940 A1 * | 6/2008 | Kakinami et al. ............. | 382/154 |
| 2008/0181486 A1 * | 7/2008 | Spooner et al. ............... | 382/154 |
| 2010/0259610 A1 * | 10/2010 | Petersen ....................... | 348/142 |
| 2010/0316282 A1 * | 12/2010 | Hope ............................ | 382/154 |
| 2011/0293180 A1 * | 12/2011 | Criminisi et al. ............. | 382/173 |
| 2012/0176477 A1 * | 7/2012 | Givon ............................ | 348/46 |
| 2012/0195471 A1 * | 8/2012 | Newcombe et al. .......... | 382/106 |

OTHER PUBLICATIONS

Ping An; Chaohui Lu; Zhaoyang Zhang, "Object segmentation using stereo images," Communications, Circuits and Systems, 2004. ICCCAS 2004. 2004 International Conference on , vol. 1, no., pp. 534,538 vol. 1, Jun. 27-29, 2004.*

* cited by examiner

*Primary Examiner* — Utpal Shah

(74) *Attorney, Agent, or Firm* — Pearl Cohen Zedek; Latzer Baratz LLP

(57) ABSTRACT

A system and method for identifying a region of interest in a digital image. A first and second images of a scene may be obtained from a respective first and second points of view. Following an acquisition of a first image from a first point of view, a subsequent image may be automatically acquired upon determining that a second view point is achieved. Based on two or more images of a scene, a background object may be removed from an image to produce an image that only includes a foreground object or a region of interest.

14 Claims, 4 Drawing Sheets

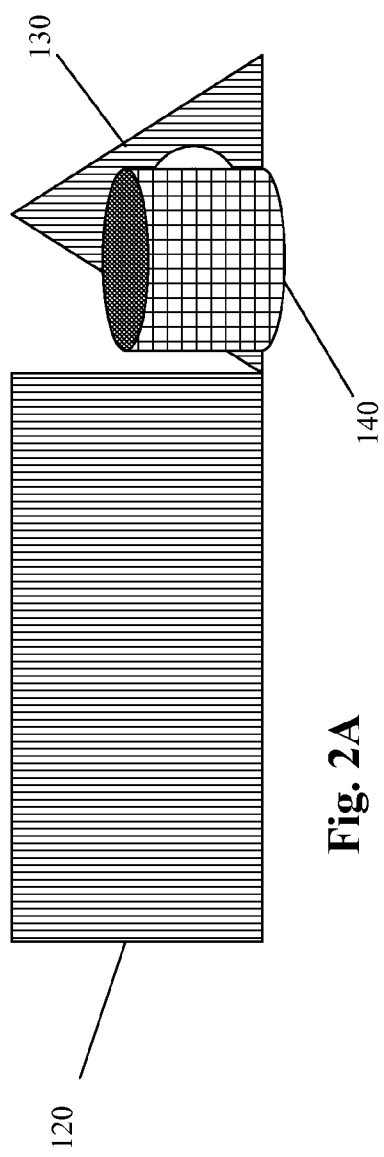
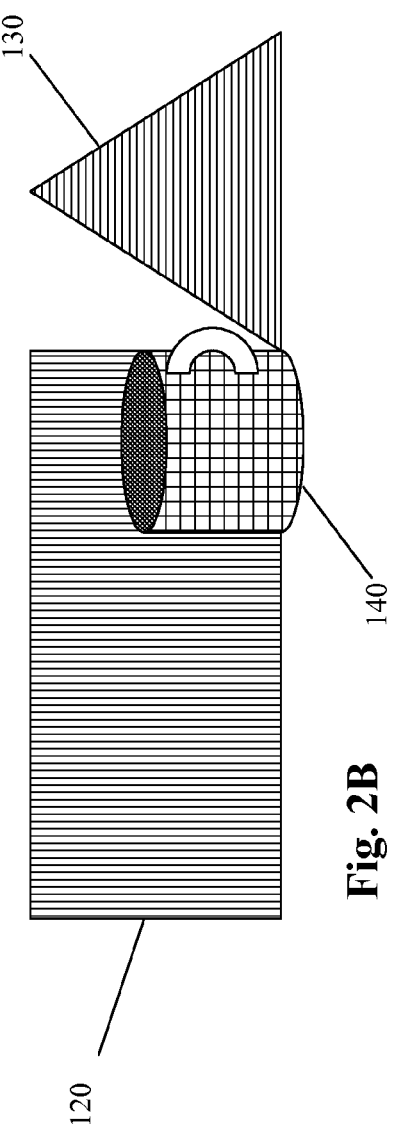
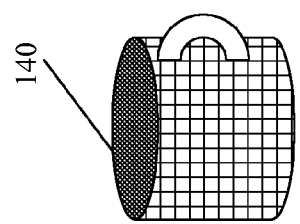
Fig. 2A
Fig. 2B
Fig. 2C

SYSTEM AND METHOD FOR IDENTIFYING A REGION OF INTEREST IN A DIGITAL IMAGE

BACKGROUND OF THE INVENTION

Object recognition or identifying a region of interest in an image are of great importance in numerous fields and applications in various industries. For example, detecting or identifying a person in an image may be used to extract the image of the person, replace the background and/or apply effects such as matting, background smoothing etc.

Image acquisition devices such as digital cameras are now widely available, for example, most mobile phones are now equipped with a camera. However, current systems and methods for object recognition in an image rely on extensive processing of the image. For example, in order to recognize specific objects in an image, a digital image may need to be uploaded to a server or provided to a home computer where an image processing application performs identification of regions of interest or object recognition.

SUMMARY OF EMBODIMENTS OF THE INVENTION

Embodiments of the invention may automatically acquire two or more digital images of a scene including an object and a background. The two or more images may be acquired from different locations or orientations of the image acquisition device. Using two or more images taken from different points of view, sets of pixels associated with, or representing the object or region of interest may be identified. Additionally or alternatively, pixels associated with, or representing the background may be identified. Based on two or more sets of pixels associated with an object, the object may be identified.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 2A shows an exemplary image produced according to embodiments of the invention;

FIG. 2B shows an exemplary image produced according to embodiments of the invention;

FIG. 2C shows an exemplary image produced according to embodiments of the invention;

Figure 1:
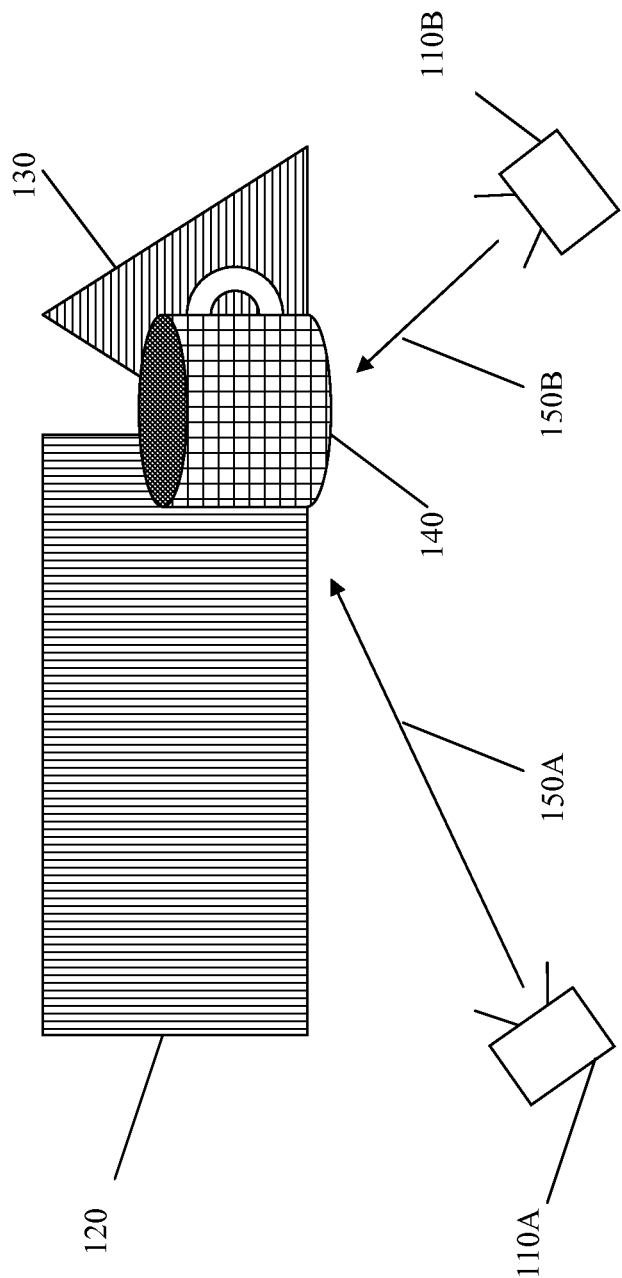
FIG. 1 shows an object, background objects and exemplary locations of an image acquisition device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1 that shows a foreground object 140, background objects 120 and 130 and exemplary locations and orientations of an image acquisition device as shown by 110A and 110B. As shown by arrows 150A and 150B, locations 110A and 110B of a camera may be associated with respective, different points of view with respect to foreground object 140 and background objects 120 and 130. Although a single cup (or mug) is shown as the foreground object 140 and a rectangle and triangle are shown as background objects 120 and 130, it will be understood that these objects were chosen for the sake of simplicity and clarity. Any number of foreground objects may be applicable and, likewise, any number of background objects may be applicable. Moreover, foreground and/or background objects may be of different sizes and at different distances from the location of an image acquisition device used for acquiring images of a scene including the foreground and background objects.

Any suitable device may be used to acquire images of a scene. For example, a digital camera that may be incorporated in a mobile phone may be used. Accordingly, although a camera may be mostly referred to herein, it will be understood that embodiments of the invention are not limited by the type, technology or other aspects of the device used for obtaining digital images of a scene.

Reference is made to FIGS. 2A, 2B and 2C that show exemplary images produced according to embodiments of the invention. The image shown by FIG. 2A may be obtained by a camera positioned as shown by 110A in FIG. 1. The image shown by FIG. 2B may be obtained by a camera positioned as shown by 110B in FIG. 1. As shown by FIG. 2A, when an image is taken from location 110A, some of the details of object 140 are hidden, e.g., only part of the handle of mug 140 is captured. As further shown, disguised by object 140, background object 130 is only partially captured. However and as shown further by FIG. 2A, background object 120 is fully captured by an image acquired from location 110A. As shown by FIG. 2B, when the camera is moved to location and orientation 110B, parts of foreground object 140 invisible from location 110A may become visible and may accordingly be captured in an image taken from location 110B. For example and as shown, the handle attached to mug 140 is fully visible from location 110B. As further shown, background object 120 which, in this example, was fully captured from location 110A is now partially obscured by foreground object 140. As further shown, portions or parts of background object 130 which were partially obscured when the camera was positioned as shown by 110A may be exposed (and captured in an image) when the camera is positioned as shown by 110B. As shown by FIG. 2C, an object may be identified and displayed. For example, background objects 120 and 130 and foreground object 140 may be identified and an image only including foreground object 140 may be produced, displayed, stored or sent to a server over a network.

Figure 3:
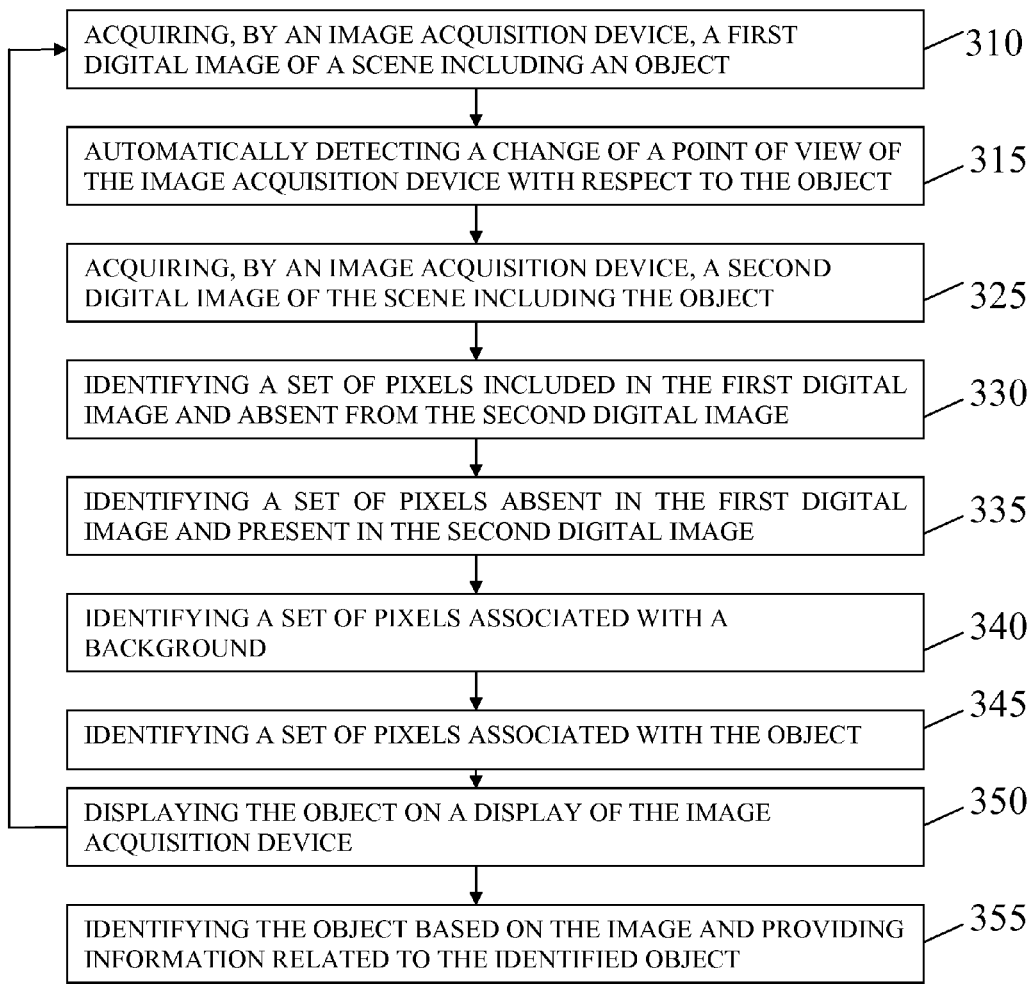
FIG. 3 is a flowchart diagram illustrating a method according to some embodiments of the present invention.

Reference is made to FIG. 3 that shows a flowchart diagram illustrating a method according to some embodiments of the present invention. It will be understood that some of the operations or steps described with reference to FIG. 3 may be optional and may, in some embodiments, be omitted. Operations and/or elements of methods described herein may be repeated or performed in a sequence or order other than the ones described herein. As shown by block 310 the method or flow may include acquiring, by an image acquisition device, a first digital image of a scene including an object. for example, a digital image of object 140 may be acquired by a camera positioned as shown by 110a. an image acquired as shown by block 310 may include background objects, e.g., objects 120 and 130.

As shown by block 315 the flow may include automatically detecting a change of a point of view of the image acquisition device with respect to the object. A second or subsequent image may be acquired upon detecting (e.g., automatically) a change of a point of view of an image acquisition device. For example, a device that includes a digital camera may also include a global positioning system (GPS) or any other system and/or application that enables navigation and/or position determination. Accordingly, a module or application executed on a device equipped with a camera and a position and/or orientation sensitive system may determine that a change of a point of view of the camera with respect to an object was made. For example, following an acquisition of a first image, an application executed on the device used for acquiring the image may monitor a movement, rotation or repositioning of the device. For example, an accelerometer system or GPS may be used). Accordingly, an application may determine if or when the image acquisition device has assumed a point of view of the same object or scene captured by the first image.

For example, in a simplified two dimensional coordinate system, following an acquisition of a first image from a first location and at a first direction of a camera, the location and direction may be recorded. Next, the camera may be moved along an X axis. However, such movement may not cause a determination that a new point of view has been assumed. Next, the camera may also be rotated (e.g., such it points at the object captured in the first image). By monitoring both a movement and a rotation of the camera, a module may determine that a new point of view of the object or scene captured in the first image has been achieved.

As shown by block 325 the flow may include acquiring, by an image acquisition device, a second digital image of the scene including the object. For example, following a determination that a new point of view has been achieved, a module executed on a camera (or on a device including a camera, e.g., a smartphone) may automatically cause a camera to acquire a second image of the scene or object. In some embodiments, a series of images may be automatically acquired. For example, a module executed on a device may automatically initiate an acquisition of a video stream. Accordingly, a first and second images acquired and used in order to detect a region of interest or to identify an object may be automatically selected from a set of images included in a video stream.

Accordingly, as shown by blocks 310, 315 and 325, a method of identifying an object in digital images may include acquiring, by a camera, a first image of a scene including the object. For example, an image of a person with a landscape behind the person, or an image of a product or object held by the person operating the camera may be acquired. Next, a movement of the camera may be identified, e.g., by an accelerometer or GPS operatively connected to the camera. In some embodiments, any movement and or repositioning of the camera, e.g., a rotation or a tilt may be identified and a repositioning of the camera such that it assumes a new or different point of view of an object or scene may be detected or identified. For example, based on a first and second geographical locations (e.g., coordinates) of a camera and further based on a respective first and second orientation of the camera provided to a controller (e.g., controller 405 discussed herein with respect to FIG. 4) and the controller may determine that an object and/or a scene captured in an image acquired from the first location and orientation may be captured in a second image taken from the second location and position.

A camera (or a computing device including, or otherwise associated with the camera, e.g., a smartphone) may automatically detect that a set of points of view assumed by the camera are relevant to an object, acquire a respective set of images and iteratively improve, in real-time, a presentation of an image of the object on a display screen. Accordingly, an image of an object and/or a separation of foreground objects in an image from background objects in the image may be iteratively improved with each new or additional image (e.g., acquired from new or additional viewpoints). Improving an image or identification of an object and/or improving a separation of foreground objects from background objects may cause a user to engage with a camera or with a device including the camera. For example, while being presented with an image of a foreground object, a user may move the camera so that it assumes additional viewpoints. Additional images acquired from additional viewpoints may be used, in real-time, to improve the image of the object, hence, a user may be provided with an improved image of a foreground object as the camera is being moved or repositioned. Accordingly, an interactive process may be enabled whereby the user moves the camera to improve an image of a foreground or a selected object.

It will be understood that embodiments of the invention are not limited by the technique, method, device or system used for separating background objects from foreground objects in an image or a set of images. Likewise, embodiments of the invention are not limited by the method, device, algorithm, application or system used for identifying, distinguishing, recognizing, determining, separating and/or indicating a region of interest (e.g., a region including a foreground object). Any method (e.g., related to image processing) may be used to determine a region of interest based on a set of images acquired, e.g., as described herein.

For example, a user may aim a camera at an object and press a button to acquire an image. Rather than acquiring a single image of the object, the camera may acquire a first image and possibly present the first image on a screen. Either automatically or based on input from a user, after determining a point of view of the object (as seen from a new location of the camera) has changed, the camera may acquire a second image of the object, use the first and second images to improve the presentation (and possibly identification) of the object and may present an improved version of the object's image. The process of acquiring an image of an object, identifying a change of point of view, acquiring an additional image of the object from a new or different point of view and using the additional image to improve a presentation of an object may be repeated any number of times, e.g., a preconfigured value may cause a camera to repeat the process three or five times or a camera may continuously improve a presentation of an object using additional images until an operator of the camera terminates the process.

Improving a presentation of an object may include identification, separation and/or removal of background objects, correcting colors, adding dimension information and/or any image or other relevant processing. For example, Improving a presentation of an object may include identifying the object and/or separating information related to the object (e.g., pixels in a digital image) from information related to elements surrounding the object and captured in an image. For example, by identifying a subset of pixels included in a first image and absent from the second image an object may be identified and better presented or displayed. Background may be eliminated from an image by identifying a subset of pixels included in the first image and included in the second image. In some cases, to identify an object or a background, a subset of pixels included in a first image and a subset of pixels included in a second image may be associated with the background or with the object. By associating two or more sets of pixels from a respective two or more images acquired from a respective two or more points of view, a background and or object may be isolated in an image, identified in an image and/or extracted from an image.

For example, upon receiving an indication from a user that an image is to be taken, e.g., a click on a button, a module may cause an acquisition of a series of images or of a short video clip. In some embodiments, an image acquisition device may automatically acquire a plurality of digital images of a scene including an object of interest, wherein at least some of the plurality of images are acquired from a respective plurality of viewpoints. For example, the first and second images acquired as described herein may be automatically acquired. For example, a sequence of two or more images may be acquired or a video clip or stream may be acquired. For example, upon detecting that a camera is moving, an application may automatically initiate acquisition of a video stream or of a sequence of images.

In some cases, by automatically acquiring a sequence of images while the camera is moved (e.g., due to a movement of the user's hand), a number of images taken from a respective number of different points of views may be automatically produced. In other embodiments, only upon detecting that a new point of view has been assumed a second image may be acquired as shown by block 325. In yet other embodiments, a user may be instructed to move the camera after the first image was taken so that a new point of view may be assumed. For example, an application may instruct a user to move an image acquisition device such that at least two view points of an object of interest are achieved. For example, following an acquisition of a first image, a module executed on a smartphone equipped with a camera (and possibly a GPS) may instruct the user to move the smartphone in a first, second or third direction and tilt, rotate or otherwise position or orient the smartphone. The module may determine that a new or different point of view of the scene or object captured in a previously acquired image was achieved and may cause the camera to acquire a second image of the scene or object such that the second image is acquired from the new or different point of view.

As shown by block 330 the flow may include identifying a set of pixels included in a first digital image and absent from a second digital image. For example, pixels representing rectangle 120, visible from point of view 110A as shown by FIG. 2A may be absent in an image taken from point of view 110B as shown by FIG. 2B. By identifying pixels (and/or associated patterns) present in a first image and absent from a second image a background may be identified. For example, rectangle 120 may be a mountain chain or other scenery in the background of mug 140. By determining that some of the pixels associated with rectangle 120 are present in a first image (e.g., as shown in FIG. 2A) and are not present in a second image (e.g., as shown in FIG. 2B) embodiments of the invention may determine that rectangle 120 is in the background of mug 140.

As shown by block 335 the flow may include identifying a set of pixels absent in the first digital image and included in the second digital image. For example, pixels representing triangle 130 that may be absent in FIG. 2a, e.g., due to parts of triangle 130 being obscured by mug 140 may be present in FIG. 2b where triangle 130 is fully visible. by identifying presence and lack thereof of pixels in a first and second images, a background may be identified. As shown by block 340, the flow may include identifying a set of pixels associated with a background. for examples, a pattern indicating or representing a background (e.g., the patterns of rectangle 120 or triangle 130) may be identified and used for identifying background objects in an image.

As shown by block 345 the flow may include identifying a set of pixels associated with an object. For example, an application may associate at least a first and second sets of pixels, included in a respective first and second images, with an object. By associating a first and second sets of pixels with the same object the object may be identified. For example, a three dimensional representation of the object may be generated based on images (and/or pixels included therein) of an object acquired from two or more viewpoints. In other embodiments, an object may be identified by associating it with a first and second sets of pixels, e.g., by determining its color or other attributes as reflected in imaging parameters associated with pixels. For example, each pixel in a digital image may be associated with one or more imaging parameters. For example, one or more octets or bytes (8 bits) related to intensity, color, hue, brightness, luminance, chromaticity and/or saturation of one or more colors may be associated with each pixel in a digital image. By associating two or more sets of pixels with an object, the object may be identified and/or differentiated from other objects or elements in an image.

By identifying background information in an image, embodiments of the invention may be able to extract or isolate a foreground object. For example and as shown by FIG. 2C, mug 140 may be identified as a foreground object by removing identified background objects 120 and 130 and may be displayed on a display screen of a computing device, e.g., a display of a smartphone.

As shown by block 350 the flow may include displaying the object on a display of the image acquisition device. For example, following a recognition of an object and/or an identification of a region of interest, the object or region of interest may be presented on a display screen, e.g., as shown in FIG. 2C. Accordingly, embodiments of the invention may automatically provide a user with an image of an object of interest. For example, a user may hold an object in one hand (e.g., mug 140), initiate an application on a smartphone or other device configured as described herein and be provided with an image (that may be two or three dimensional) of device where the image may only include the object, possible without any other background objects or information. For example, an image produced according to the above example may not include the user's hand or any objects present in the background when the image was acquired. Generating, presenting and/or improving an image of an object may be performed in real-time. For example, the process of associating additional sets of pixels with an object may be performed in real-time and may be terminated by a user, e.g., when the user is satisfied with the image of the object provided. A real-time process may receive images as they are acquired, process received images as described herein and improve an image of an object or region of interest based on such received images. Accordingly, a user may point a camera at an object, commence acquisition of images of the object and be provided with a an image of the object where the image does not include any objects surrounding the object of interest. For example, an electrical appliance placed on a table and having a picture on a wall behind it may be identified as described herein and an image of the appliance excluding the table and the picture may be provided.

As shown by the arrow connecting blocks 350 and 310, the flow may be repeated. For example, an iterative procedure may be repeated until a user is satisfied with the produced image. For example, if following an automatic identification of an object as described herein the displayed object is not sufficiently close to the actual object, a user may cause an application to repeat some or all of the operations described herein. By using information in additional images acquired in an iterative procedure, an image of an object may be improved.

As shown by block 355 the flow may include identifying the object based on the image and providing information related to the identified object. For example, an image of an object may be provided to an application that may identify the object (e.g., based on matching the image of the object with information in a database). Accordingly, by identifying the object, information related to the object may be provided. For example, the foreground object may be a specific product. Using embodiments of the invention, a user may obtain a clear image of the product, e.g., an image only including the product but excluding all other captured information, for example, as shown by FIG. 2C. The user (or an application) may send a clear image of the product to a server that may, possibly using a database, identify the product and may further provide any information related to the product. It will be understood any other usage or an image of an object produced as described herein may be made without departing from the scope of the invention.

Figure 4:
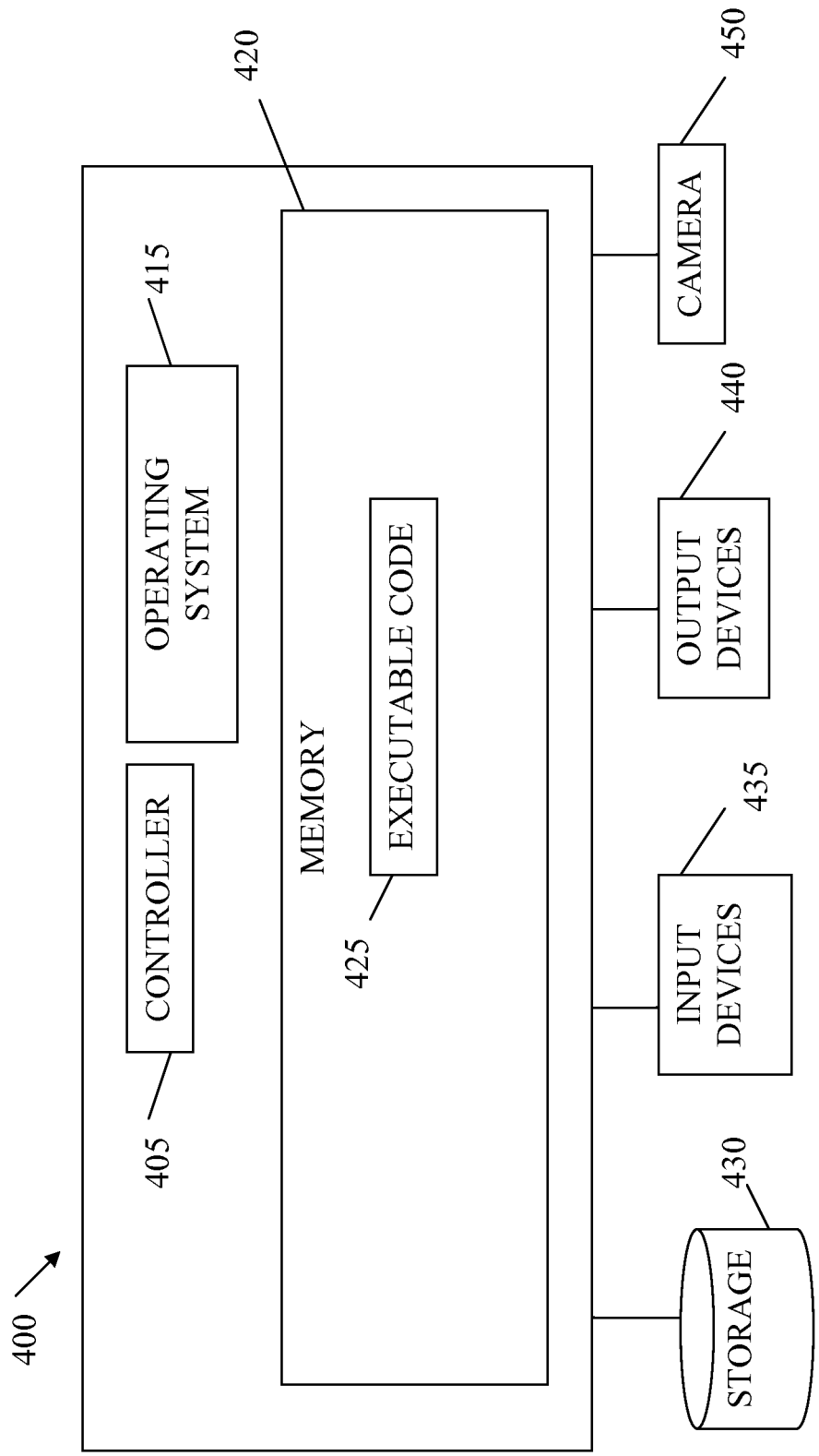
FIG. 4 shows high level block diagram of an exemplary computing device according to embodiments of the present invention.

Reference is made to FIG. 4, showing high level block diagram of an exemplary computing device according to embodiments of the present invention. Computing device 400 may include a controller 405 that may be, for example, a central processing unit processor (CPU), a chip or any suitable computing or computational device, an operating system 415, a memory 420, a storage 430, an input devices 435 and an output devices 440.

Operating system 415 may be or may include any code segment designed and/or configured to perform tasks involving coordination, scheduling, arbitration, supervising, controlling or otherwise managing operation of computing device 400, for example, scheduling execution of programs. Operating system 415 may be a commercial operating system. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different memory units.

Executable code 425 may be any executable code, e.g., an application, a program, a process, task or script. Executable code 425 may be executed by controller 405 possibly under control of operating system 415. For example, executable code 425 may be an application that may be provided with a digital image (e.g., in the form of a set of pixels), process the set of images, e.g., as described herein, in order to identify a specific object in the digital image, display the identified image on a display of computing device 400 and/or send the image of the identified object to a remote server. Storage 430 may be or may include, for example, a hard disk drive, a floppy disk drive, a Compact Disk (CD) drive, a CD-Recordable (CD-R) drive, a universal serial bus (USB) device or other suitable removable and/or fixed storage unit. Digital images may be stored in storage 430 (e.g., in the form of a set of pixels) and may be loaded from storage 430 into memory 420 where they may be processed by controller 405, e.g., in order to identify a specific or foreground object.

Input devices 435 may be or may include a mouse, a keyboard, a touch screen or pad or any suitable input device. Input devices 435 may include a microphone, e.g., if device 400 is a smartphone. It will be recognized that any suitable number of input devices may be operatively connected to computing device 400 as shown by block 435. Input devices may include sensors that may provide input related to a location or position of computing device 400. For example, input devices may provide input usable by a GPS application, e.g., as known in the art. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400 as shown by blocks 435 and 440. For example, a wired or wireless network interface card (NIC), a printer or facsimile machine, a universal serial bus (USB) device or external hard drive may be included in input devices 435 and/or output devices 440. As shown, computing device 400 may include or be operatively connected to a camera 450. For example, camera 450 may be or may include any suitable imaging system. For example, camera 450 may include any number of lenses. Camera 450 may include a complementary metal oxide semiconductor (CMOS) imaging camera, or other imagers may be used, e.g., a CCD imager.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 420, computer-executable instructions such as executable code 425 and a controller such as controller 405.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE-PROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of analyzing digital images, the method comprising:
   acquiring, by a camera, a first image of a scene from a first point of view;
   presenting said first image on a display screen;
   automatically detecting, by the camera, movement of the camera to a second point of view of the same scene captured by the first image;
   upon said detection, automatically causing a camera to acquire a second image of the scene from the second point of view;
   separating a foreground object included in the scene based on pixels included in one of the first and second images and excluded from the other one of the first and second images; and
   improving, by using the second image, presentation of said separated foreground object in the image displayed on the display screen.

2. The method of claim 1, comprising automatically identifying a set of points of view assumed by the camera, acquiring a respective set of images and iteratively improving, in real-time, separation of the foreground object.

3. The method of claim 1, wherein said automatically causing a camera to acquire a second image comprises instructing a user to move the camera in order to acquire at least said second image of the scene from said second point of view.

4. The method of claim 1, comprising:
   acquiring an additional image of the scene from an additional point of view;
   improving by using the additional image, in real-time, presentation of said separated foreground object; and
   presenting the improved presentation on the display screen.

5. The method of claim 1, comprising identifying the foreground object.

6. The method of claim 1, wherein the first and second images are automatically selected from a provided set of images.

7. The method of claim 1, comprising sending an image of the foreground object to a remote computer.

8. An article comprising a non-transitory computer-readable storage medium, having stored thereon instructions, that when executed on a computer, cause the computer to:
   receive, from a camera, a first image of a scene from a first point of view;
   present said first image on a display screen;
   automatically detect movement of the camera to a second point of view of the same scene captured by the first image;
   upon said detection, automatically cause a camera to acquire a second image of the scene from the second point of view;
   separate a foreground object included in the scene based on pixels included in one of the first and second images and excluded from the other one of the first and second images; and
   improve, by using the second image, presentation of said separated foreground object in the image displayed on the display screen.

9. The article of claim 8, wherein the instructions when executed further result in identifying a set of points of view assumed by the camera, receiving a respective set of images and iteratively improving, in real-time, separation of the foreground object.

10. The article of claim 8, wherein the instructions when executed further result in said automatically causing a camera to acquire a second image comprises instructing a user to move the camera in order to acquire at least said second image of the scene from said second point of view.

11. The article of claim 8, wherein the instructions when executed further result in:
   acquiring an additional image of the scene from an additional point of view;
   improving by using the additional image, in real-time, presentation of said separated foreground object; and
   presenting the improved presentation on the display screen.

12. The article of claim 8, wherein the instructions when executed further result in identifying the foreground object.

13. The article of claim 8, wherein the instructions when executed further result in automatically selecting the first and second images from a provided set of images.

14. The article of claim 8, wherein the instructions when executed further result in sending an image of the foreground object to a remote computer.

* * * * *